United States Patent [19]

Iwasaki

[11] Patent Number: 4,745,485
[45] Date of Patent: May 17, 1988

[54] PICTURE DISPLAY DEVICE

[75] Inventor: Shoji Iwasaki, Tottori, Japan

[73] Assignee: Sanyo Electric Co., Ltd, Japan

[21] Appl. No.: 821,160

[22] Filed: Jan. 21, 1986

[30] Foreign Application Priority Data

| Jan. 28, 1985 | [JP] | Japan | 60-14038 |
| Mar. 19, 1985 | [JP] | Japan | 60-55357 |
| Mar. 28, 1985 | [JP] | Japan | 60-64191 |
| Sep. 13, 1985 | [JP] | Japan | 60-204089 |

[51] Int. Cl.$^4$ .............................................. H04N 5/74
[52] U.S. Cl. ...................................... 358/236; 340/784
[58] Field of Search ............... 358/236, 56, 59, 241; 340/784, 802

[56] References Cited

U.S. PATENT DOCUMENTS

| 3,787,834 | 1/1974 | Elliott | 340/784 |
| 4,194,215 | 3/1980 | Shionoya | 358/56 |
| 4,317,115 | 2/1982 | Kawakami et al. | 340/784 |
| 4,449,148 | 5/1984 | Inohara et al. | 358/56 X |
| 4,571,614 | 2/1986 | Iyehara et al. | 358/56 |
| 4,581,654 | 4/1986 | Kobayashi et al. | 358/59 X |
| 4,602,292 | 7/1986 | Togashi et al. | 358/236 X |
| 4,630,122 | 12/1986 | Morokawa | 358/241 |
| 4,679,043 | 7/1987 | Morokawa | 340/784 |

FOREIGN PATENT DOCUMENTS

| 54-48433 | 4/1979 | Japan | 358/236 |
| 55-28671 | 2/1980 | Japan | 358/236 |
| 57-48303 | 3/1983 | Japan | 358/56 |
| 58-116884 | 7/1983 | Japan . | |
| 2106689 | 4/1983 | United Kingdom . | |
| 2106690 | 4/1983 | United Kingdom . | |
| 2139795 | 11/1984 | United Kingdom . | |
| 2162674 | 2/1986 | United Kingdom | 358/59 |

Primary Examiner—James J. Groody
Assistant Examiner—E. Anne Faris
Attorney, Agent, or Firm—Darby & Darby

[57] ABSTRACT

In a picture display device in accordance with the present invention, a selector (18) selects alternately the address output of a write address counter (15) and the address output of read address counters (16 and 17), and a selector (19) selects alternately the address output of a first read address counter (16) and the address output of a second address read counter (17). Then, picture element data based on a video signal from a picture processing circuit (1) is written in frame memories (4 and 5) corresponding to the two display areas (11) and (12) divided as the upper half and the lower half of the screen of a liquid crystal display (10) and after that, the picture element data is read out from the frame memory (4) and displayed on the upper display area (11) and written in the frame memory (5). Subsequently, the picture element data is read out from the frame memory (5) corresponding to the lower display area (12) so as to be displayed on the display area (12). Writing and reading of the frame memories (4 and 5), reading of the frame memory (4) and reading of the frame memory (5) are performed alternately. Then, writing and reading of the frame memory (5) and reading of the frame memory are performed alternately, whereby the picture element data is displayed with good quality on the liquid crystal display (10) by using the frame memories (4 and 5) corresponding to one frame.

12 Claims, 10 Drawing Sheets

PICTURE DISPLAY DEVICE

BACKGROUND OF THE INVENTION

1. Field of the Invention

The present invention relates to a picture display device. More particularly, the present invention relates to a picture display device such as a device for displaying picture element data on a liquid crystal display using a cycle steal display system.

2. Description of the Prior Art

In the prior art, display devices for displaying picture element data on the upper and lower display areas as two divided areas of the screen region of a liquid crystal display are shown for example in Japanese Patent Laying-Open Nos. 28671/1980, 78598/1982 and 132791/1983. Any of these devices displays a television picture and the like on a liquid crystal display. In these picture display devices, the display region is divided into upper and lower two areas for the purpose of decreasing the burden of time sharing operation dependent on the responsivity of the liquid crystal display.

However, as the number of picture elements on the liquid crystal display increases, not only the responsivity of the liquid crystal display itself but also the responsivity of the peripheral circuit including a drive device become worse conspicuously. For example, if a television video signal fed as serial data at a predetermined speed is directly applied to the drive device, the picture quality becomes coarse and the picture displayed is liable to sway, which would lead to bit degradation due to impossibility of follow-up. Therefore, various methods are used, for example, a method in which a video signal applied by means of a frame memory is temporarily stored and the writing speed and the reading speed of the frame memory are changed, or a method in which frame memories for two frames are used alternately for writing and reading, or a method in which a video signal is regularly selected and fed to the drive device, is adopted for the purpose of eliminating the above stated drawback. However, these methods are not preferred because a large-capacity memory is required or the picture elements displayed are coarse and the picture quality is deteriorated.

SUMMARY OF THE INVENTION

Therefore, a principal object of the present invention is to provide a picture display device capable of displaying a picture of good quality using frame memories for one frame corresponding to the display region of a liquid crystal display.

To briefly state the present invention, frame memories are provided respectively corresponding to the two display areas divided as the upper and lower areas on a liquid crystal display and after picture element data is written in the frame memories, the picture element data corresponding to the upper display area is read out from one of the frame memories and then, after picture element data is written again in the frame memories, the picture element data corresponding to the lower display area is read out from the other frame memory. Thus, the picture element data read out are displayed respectively to the divided two display areas on the liquid crystal display.

Consequently, according to the present invention, the above described sequence of operation consisting of writing of the frame memories, reading of the picture element data corresponding to the upper display area, writing of the frame memories and reading of the picture element data corresponding to the lower display area is regarded as one cycle and by repeating this cycle of operation, display data can be transferred at a speed half as much as the writing speed of the frame memories.

Accordingly, the frame memories can be formed with a total capacity corresponding to one frame.

In a preferred embodiment of the present invention, a display timing signal indicating an effective display area for the picture element data is generated and then, a first delay timing signal is generated with a delay corresponding to one clock signal amount from the display timing signal. In response to the first delay timing signal, picture element data is stored in the frame memories. Subsequently, a second delay timing signal is generated with a delay by several clocks from the first delay timing signal and in response to the second delay timing signal, the read out picture element data is applied to the liquid crystal display so that the display is driven. Then, a delay is further applied by several clocks from the first delay timing signal so that the center of a picture is made to coincide with the center of the screen of the liquid crystal display.

In a further preferred embodiment, an n-bit gradation signal is used as a video signal and gradation display can be made on the liquid crystal display.

In a still further preferred embodiment of the present invention, R, G, B color signals are used as a video signal and these color signals are selected and stored in the frame memories. If the order of color signals to be selected for each horizontal period is changed at the time of selection of the R, G, B color signals, a color pattern in a mozaic form can be displayed.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
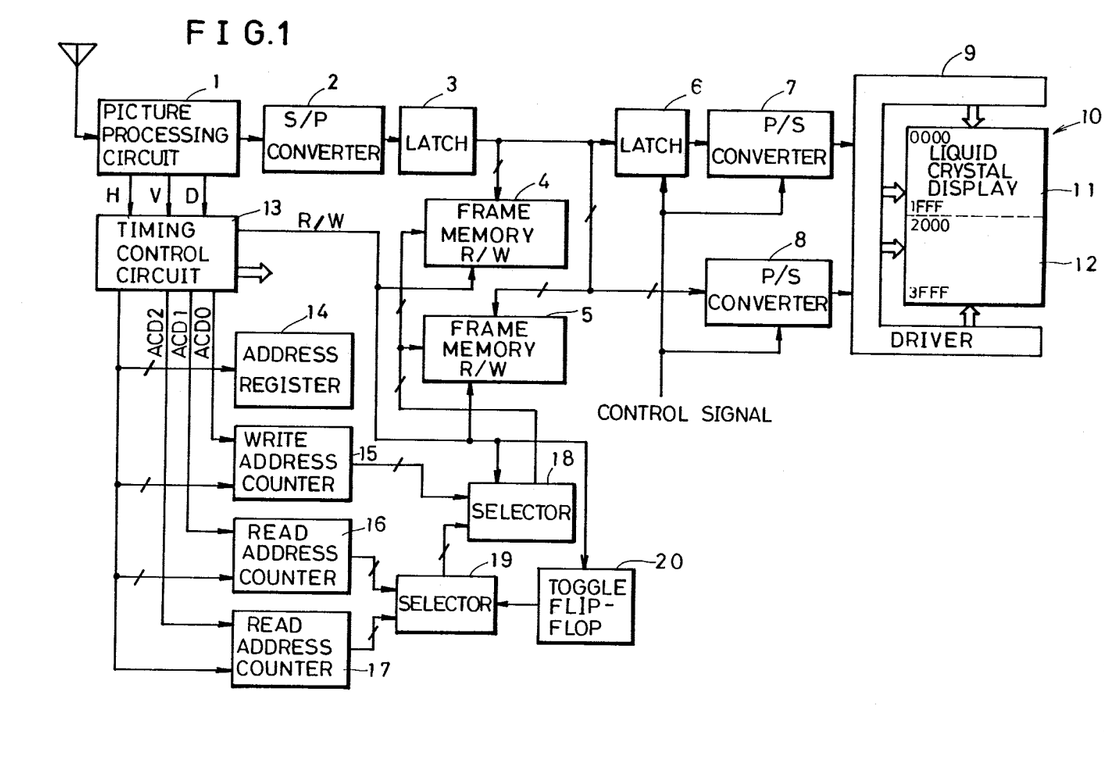
FIG. 1 is a specific block diagram of an embodiment of the present invention.

FIG. 1 is a specific block diagram of an embodiment of the present invention. First, referring to FIG. 1, a construction of an embodiment of the present invention will be described. As the picture display device shown in FIG. 1, an example of a monochromatic display device without gradation with the number of picture elements being 512×256 dots will be described. However, the picture display device is not limited thereto.

In FIG. 1, a picture processing circuit 1 comprises a tuner, an intermediate-frequency amplifier etc. and provides a monochromatic video signal serially. The picture processing circuit 1 may be formed by a buffer, for example, which receives a video signal from a video tape recorder, a personal computer, a magnetic picture filing apparatus or the like. The serial video signal provided from the video processing circuit 1 is supplied to a S/P converter 2. The S/P converter 2 converts the serial video signal to a parallel signal for every eight bits. The parallel video signal converted by the S/P converter 2 is supplied to a latch circuit 3, where it is latched. The latch circuit 3 serves to apply timing to the video signal.

The picture element data based on the video signal latched in the latch circuit 3 is supplied to frame memories 4 and 5, a latch circuit 6 and a P/S converter 8. The frame memories 4 and 5 serve to store for one frame, picture element data corresponding to the dots of a liquid crystal display 10 to be described below. The frame memories have storage regions of 8192 bytes (65536 bits) for example and are formed by two random access memories operable in a static manner. The data corresponding to one dot is treated as one bit (white or black data). The frame memory 4 stores the picture element data to be displayed in the upper display area 11 of the liquid crystal display 10 and the frame memory 5 stores the picture element data to be displayed in the lower display area 12.

The latch circuit 6 latches the picture element data based on the video signal latched in the latch circuit 3 or the picture element data read out from the frame memory 4. The picture element data latched in the latch circuit 6 is supplied to a P/S converter 7 an undergoes parallel-to-serial conversion so as to be supplied to a driver 9. The P/S converter 8 converts the picture element data based on the video signal latched in the latch circuit 3 or the picture element data read out from the frame memory 5 to a serial signal so that it is supplied to the driver 9. The driver 9 drives the liquid crystal display 10. For example, HD44100H of Hitachi Ltd. is used as the driver 9. The drive 9 adapts timing upon receipt of two groups of picture signals serially transferred and applies bias to the liquid crystal display 10 so that the upper and lower display areas make display independently of each other.

The liquid crystal display 10 is a twisted nematic type liquid crystal display having a display region divided into two areas, that is, the upper display area 11 and the lower display area 12. The screens (or electrode groups) of the upper and lower display areas 11 and 12 can be enabled independently, each having picture elements of 256×256 dots (in total, 512×256 dots).

The timing control circuit 13 controls timing in a manner in which it receives a vertical blanking signal (V), a horizontal blanking signal (H) and a display signal (D) from the picture processing circuit 1 and applies a read/write timing signal (R/W) to the frame memories 4 and 5, and to a selector 18 and a toggle flip-flop 20. In addition, the timing control circuit 13 applies a data transfer signal to an address register 14 and applies count-up signals ACD0, ACD1 and ACD2 to a write address counter 15 and area read address counters 16 and 17, respectively. The address register 14 comprises three registers continuously located for applying start addresses to the read address counters 16 and 17.

The write address counter 15 counts the count-up signal ACD0 and designates the write addresses of the frame memories 4 and 5 based on the count output. The read address counters 16 and 17 respectively count the count-up signals ACD1 and ACD2 and designate the respective read addresses of the frame memories 4 and 5 based on the counter outputs. The address output of the write address counter 15 is supplied to the selector 18 and the address outputs of the read address counters 16 and 17 are supplied to the selector 19. The selector 19 selects the address outputs of the read address counters 16 and 17 based on a signal having a frequency equal to a half of the frequency of the read/write timing signal R/W obtained by the toggle flip-flop 20. The selector 18 selects the address output of the write address counter 15 and the address output of the read address counter 16 or 17 selected by the selector 19, based on the timing of the read/write timing signal R/W, so that the address outputs thus selected are supplied to the frame memories 4 and 5.

Figure 2:
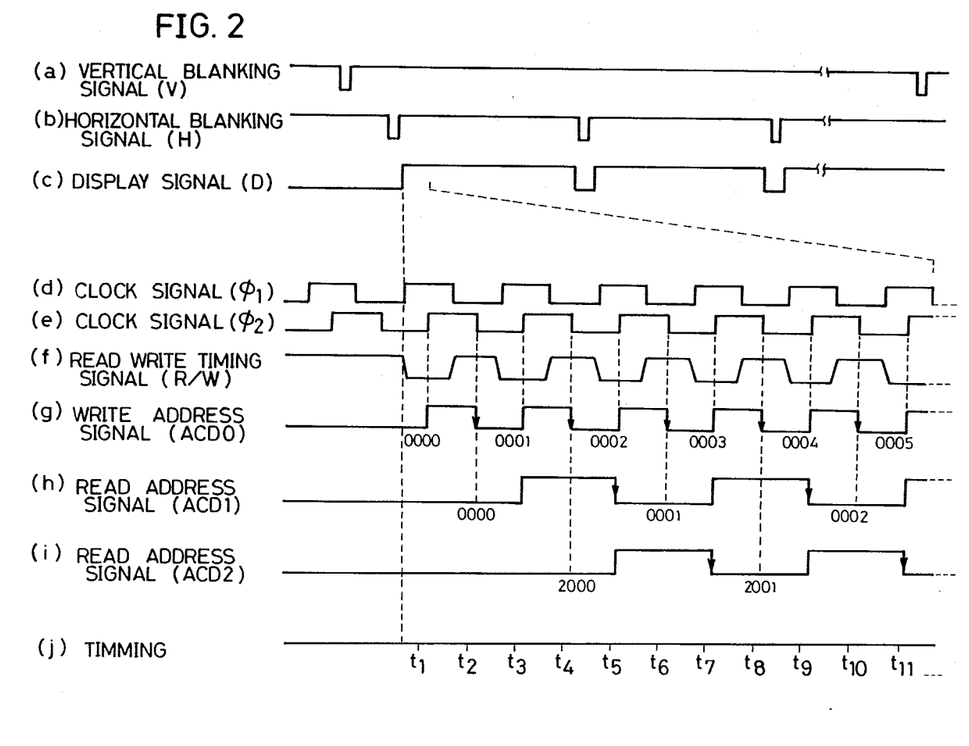
FIG. 2 is a waveform diagram of the respective portions shown in FIG. 1.

FIG. 2 is a waveform diagram of the respective portions shown in FIG. 1.

Now, referring to FIGS. 1 and 2, operation of an embodiment of the present invention will be specifically described. First, from the radio wave received by the picture processing circuit 1 or the video signal supplied thereto, the vertical blanking signal (V) shown in FIG. 2(a), the horizontal blanking signal (H) shown in FIG. 2(b) and the display signal (D) shown in FIG. 2(c) are supplied to the timing control circuit 13. The picture processing circuit 1 provides the video signal serially during the level "H" of the display signal (D). This video signal is a monochromatic picture signal corresponding to 256 dots for one scanning and it is converted to a parallel signal for every eight bits by the S/P converter 2 so as to be latched in the latch circuit 3. Then, the parallel signal is provided from the latch circuit 3 so as to be adapted to the write timing of the read/write timing signal R/W. On the other hand, based on the vertical blanking signal (V), the content of the start address stored in the address register 14 is transferred to the write address counter 15 and the read address counters 16 and 17.

The frame memories 4 and 5 are controlled by the two-phase clock signals $\phi 1$ (FIG. 2(d)) and $\phi 2$ (FIG. 2(e)) provided from the timing control circuit 13 so that the write state and the read state of the stored content are selected alternately by the clock signal $\phi 1$. Then, the addresses of the frame memories 4 and 5 to be written or to be read out are supplied selectively by the write address counter 15 and the read address counters 16 and 17. The write address counter 15 and the read address counters 16 and 17 are respectively made to count in synchronism with the clock signal $\phi 2$.

Now, a detailed description will be made by taking the first frame as an example. In response to the vertical blanking signal (V), the address output of the write address counter 15 shown in FIG. 2(g) is set to "0000" and the address counters 15, 16 and 17 start counting at the time when the address outputs of the read address counters 16 and 17 are set to "0000" and "2000" respectively as shown in FIGS. 2(h) and 2(i). At the first timing t1 shown in FIG. 2(i), the read/write timing signal R/W shown in FIG. 2(f) falls to the level "L" representing the write state and the video signal is supplied from the latch circuit 3 to the frame memories 4 and 5. At this time, however, since the frame memory 4 is addressed by the address output of the write address counter 15 through the selector 18, the video signal is stored in the address "0000".

At the next timing t2, the read/write timing signal R/W attains the level "H" indicating the read state and the address at this time becomes "0000" based on the address output of the read address counter 16 so that the stored content is read out and located in the latch circuit 6. Then, the write address counter 15 advances counting by 1 at the fall of the count-up signal ACD0 at this timing so that the address becomes "0001".

Further, at the timing t3, the frame memory 4 is brought again into the write state so that the video signal is stored in the address "0001". Subsequently, at the timing t4, addressing is made based on the address output of the read address counter 17 and the content of the address "2000" is provided from the frame memory 5. However, in the first frame, a video signal is not stored in the address "2000" of the frame memory 5. Then, in this state, the video signal read out from the frame memories 4 and 5 and the video signal read out at the previous timing t2 and latched in the latch circuit 6 are supplied to the P/S converters 7 and 8 respectively so that they are converted to serial signals. The video signals thus converted are supplied to the driver 9 as the picture signals respectively corresponding to the upper display area 11 and the lower display area 12 of the liquid crystal display 10, whereby pictures are displayed on the liquid crystal display 10.

Subsequently, in the same manner, writing and reading of the frame memories 4 and 5 are performed alternately. The writing operation is performed according to the advance by one address starting from the address "0000" and the reading operation is performed according to the advance by one address starting from the address "0000" for reading the data of the upper display area 11 and according to the advance by one address starting from the address "2000" for reading the data of the lower display area 12.

Therefore, the video signal of the first frame corresponding to the upper display area 11 (the address thereof being 1FFFF) is read out at the timing immediately before the end of the writing of the first frame (the last address being 3FFF) and the video signal corresponding to the lower display area 12 (the address thereof being 3FFFF) is read out immediately after that. More specifically, the writing time and the reading time for one frame are equal and in the reading operation, for the upper display area 11, the video signal of the frame being presently written is read out and for the lower display area 12, the video signal one frame ahead thereof is read out.

Since the picture signal is applied to the driver 9 at a speed equal to a half of the writing speed to the frame memories 4 and 5 and the continuity of the video signal is maintained in the upper and lower display areas 11 and 12, the picture is represented stably even if it is a moving picture.

In the above described example, if the picture processing circuit 1 includes an A/D converter, gradation can be represented completely in the same manner as described above, in the form of video data such as 2 bits (4 gradations), 3 bits (8 gradations) or 4 bits (16 gradations) for one picture element.

Figure 3:
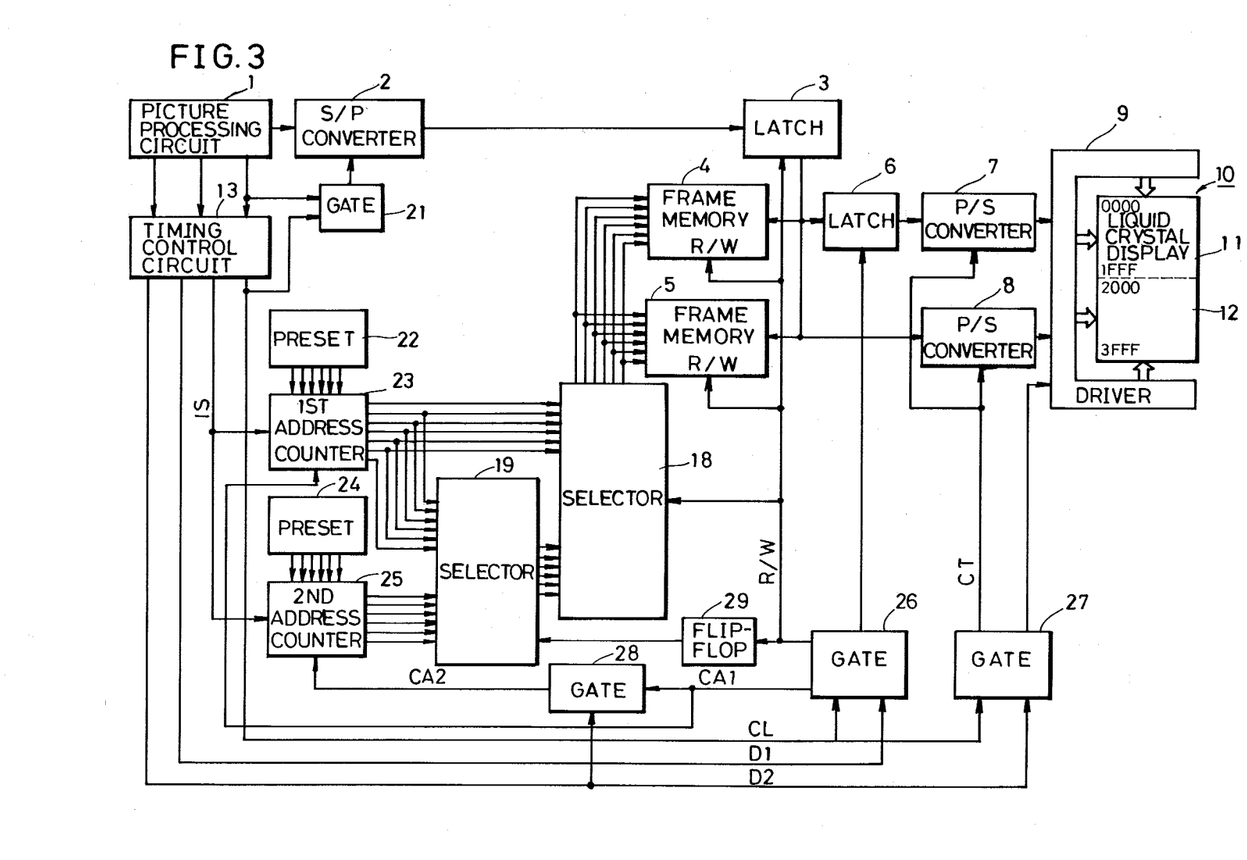
FIG. 3 is a specific block diagram of another embodiment of the present invention.
Figure 4:
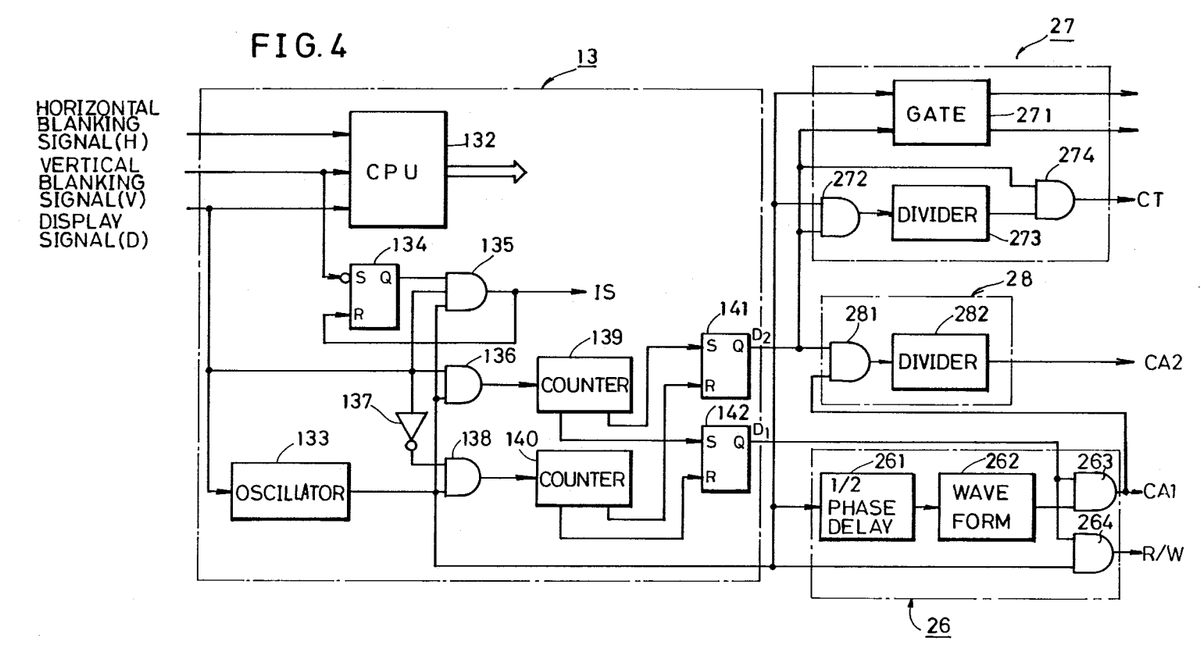
FIG. 4 is a detailed block diagram of the timing control circuit shown in FIG. 3.

FIG. 3 is a specific block diagram of another embodiment of the present invention and FIG. 4 is a detailed block diagram of the timing control circuit 13 and the gates 26 to 28 shown in FIG. 3.

Now, referring to FIGS. 3 and 4, a construction of this embodiment will be described. This embodiment shown in FIG. 3 is the same as the embodiment shown in FIG. 1 except for the below described points.

The first address counter 23 corresponds to the write address counter 15 and the read address counter 16 shown in FIG. 1. More specifically, the first address counter 23 provides an address signal advancing by one address through the selector 18 at the time of writing, and at the time of reading, it neglects the lower one bit and provides an address signal advancing at a half speed compared with the advancing speed in the above described writing operation. The second address counter 25 corresponds to the read address counter 17 shown in FIG. 1 and provides an address signal for reading the picture element data of the frame memory 5. In the first and second address counters 23 and 25, start addresses are set by preset means 22 and 24, respectively. More specifically, if the addresses of the frame memories 4 and 5 are represented as hexadecimal digits (0.1 to 9 an A to F corresponding to decimal digits 0.1 to 9 and 10 to 15 respectively) and if the address in the upper display area of the liquid crystal display 10 is in a range of 0000 to 1FFF, the address "0000" is set or stored in the preset means 22 and if the address of the lower display area 12 is in a range of 2000 to 3FFF, the address "2000" is set or stored in the preset means 24.

Furthermore, in the embodiment shown in FIG. 3, gate circuits 26 to 28 and a flip-flop 29 are provided so as to receive the signal from the timing control circuit 13. Referring to FIG. 4, a detailed construction of the timing control circuit 13 and the gate circuits 26 to 28 will be described in the following. The timing control circuit 13 comprises a CPU132, an oscillator 133, flip-flops 134, 141 and 142, counters 139 and 140 etc. The CPU 132 sets start addresses in the preset means 22 and 24 and performs other control operation. The oscillator 133 generates a clock signal. The flip-flop 134 is set by the vertical blanking signal (V). The Q output of the flip-flop 134 is supplied to the AND gate 135. The AND gate 135 receives the display signal D and the clock signal CL and provides an initial signal IS. The initial signal IS is supplied as a set signal for setting start addresses in the first and second address counters 23 and 25 shown in FIG. 3.

To the AND gate 136, the display signal D and the clock signal CL are supplied and only in a period when the display signal D is supplied thereto, the AND gate 136 provides the clock signal CL to the counter 139. The AND gate 138 receives an inverted signal obtained by inverting the display signal D by the inverter 137 and the clock signal CL. The output of the AND gate 138 is supplied to the counter 140. The counter 139 counts the clock signal CL and supplies the count output of the first bit as a set input to the flip-flop 142 and the count output of the third bit as a set input to the flip-flop 141. The counter 140 counts the clock signal CL and supplies the count output of the first bit as a reset input to the flip-flop 142 and the count output of the third bit as a reset input to the flip-flop 141. Consequently, the flip-flop 142 provides a first timing signal D1 delayed by one clock from the display signal D and the flip-flop 141 provides a second timing signal D2 delayed by three clocks from the display signal D.

The gate circuit 26 comprises a ½ phase delay circuit 261, a waveform shaping circuit 262 and AND gates 263 an 264. The ½ phase delay circuit 261 delays the clock signal by ½ of its phase. The waveform shaping circuit 262 shapes the waveform of the output of the ½ phase delay circuit 261 and supplies the shaped output to the AND gate 263. To the AND gate 263, the first timing signal D1 is supplied and a count-up signal CA1 is provided therefrom. The count-up signal CA1 is supplied to the first address counter 23 and also supplied to the gate circuit 28. The AND gate 264 receives the first timing signal D1 and the clock signal CL and provides a read/write timing signal R/W therefrom. The read/write timing signal R/W is supplied to the latch circuit 3, the frame memories 4 and 5, the selector 18 and the flip-flop 29.

The gate circuit 28 comprises an AND gate 281 and a ½ frequency divider 282. The AND gate 281 receives the second timing signal D2 and the count-up signal CA1 and the ½ frequency divider 282 divides by two the output of the AND gate 281 and provides the count-up signal CA2. The count-up signal CA2 is supplied to the second address counter 25.

The gate circuit 27 comprises a gate 271, AND gates 272 and 274 and a ½ frequency divider 273. The gate 271 receives the clock signal CL and the second timing signal D2 and supplies a control signal to the driver 9. The AND gate 272 receives the clock signal CL and the second timing signal D2 and provides a clock signal CL in a period when the second timing signal D2 is provided therefrom. The ½ frequency divider 273 divides by two, the output of the AND gate 272 and supplies the divided output to one input terminal of the AND gate 274. To the other input terminal of the AND gate 274, the second timing signal D2 is supplied. Then, the AND gate 274 provides a transfer timing signal CT. The transfer timing signal CT is supplied to the P/S converters 7 and 8 shown in FIG. 3.

Figure 5:
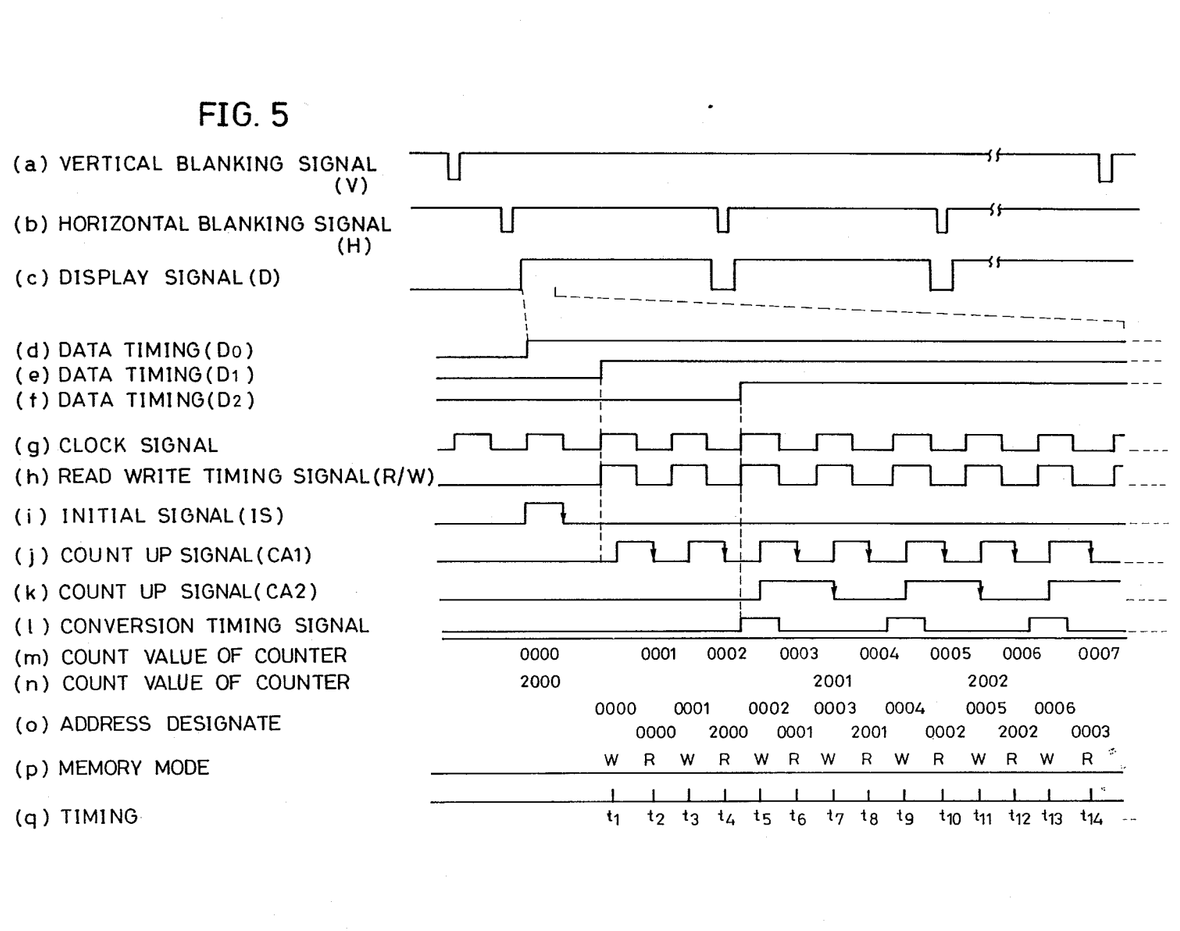
FIG. 5 is a waveform diagram of the respective portions shown in FIGS. 3 and 4.

FIG. 5 is a waveform diagram of the respective portions shown in FIGS. 3 and 4.

Now, referring to FIGS. 3 to 5, an operation of this second embodiment of the present invention will be specifically described. The picture processing circuit 1 provides a serial video signal to the S/P converter 2 in the same manner as described previously in connection with the embodiment in FIG. 1. The gate circuit 21 receives the display signal D (shown in FIG. 5(c)) provided from the picture processing circuit 1 and the clock signal CL (shown in FIG. 5(g)) provided from the timing control circuit 13 and supplies a timing signal to the S/P converter 2. The S/P converter 2 converts the serial image signal to a 8-bit parallel signal based on the timing signal. The latch circuit 3 latches the 8-bit parallel video signal with the writing timing based on the read/write timing signal R/W provided from the gate circuit 26.

The timing control circuit 13 provides an initial signal IS shown in FIG. 5(i) based on the display signal D after the output of the vertical blanking signal V shown in FIG. 5(a). Based on the initial signal IS, the first and second address counters 23 and 25 receive the contents of the start addresses set in the preset means 22 and 24, respectively.

For the frame memories 4 and 5, memory modes, namely, a write mode W and a read mode R are designated according to the level of the read/write timing signal R/W and based on the clock signal CL (shown in FIG. 5(g)) provided from the oscillator 133, the memory modes are selected alternately. The memory modes start at the rise of the first data timing signal D1 obtained by the counter 140 and the flip-flop 142 shown in FIG. 4. The first data timing signal D1 is delayed by one clock from the display signal D as shown in FIG. 5(e). This delay of the first data timing signal D1 by one clock from the display signal D is made in order to complete the conversion processing by S/P converter 2 in a period corresponding to the delay, to make smooth the cycle consisting of writing, reading of the upper display area, writing and reading of the lower display area which characterizes the present invention and to exclude influence dependent on the number of picture elements in the vertical direction.

More specifically, in the present invention, as described previously in connection with FIG. 1, when writing of the picture element data for one frame is brought to an end, reading of the picture element data for one frame is also ended and the number of dots of picture element data to be taken out within a horizontal scanning line depends on the number of pulses generated by the clock signal CL. Accordingly, assuming that the pulse width of the horizontal blanking signal H shown in FIG. 5(b) is 64 $\mu$sec and that the pulse width of the display signal D is 40 $\mu$sec, the clock signal CL of (40/n)$\mu$sec may be used if the number of dots in the horizontal direction is n(n=256 in this example).

The addresses of the frame memories 4 and 5 to be written or to be read out by the above described clock signal CL are designated selectively by the respective address outputs of the first and second address counters 23 and 25. More specifically, the first address counter 23 is made to advance counting by the gate circuit 26 each time the read mode R is selected and it supplies the address output to the frame memories 4 and 5 through the selector 18 each time the write mode W is selected. The address output of the first address counter 23 starts by the address "0000" as shown in FIG. 5(m) and advances by two addresses each time the write mode W is applied. The address output of the first address counter is provided through the selectors 18 and 19 every other time the read mode R is applied. In this case, since the lowest bit is disregarded, the address to be read out advances at a speed half the speed of the write/read mode.

On the other hand, the second address counter 25 is made to advance counting in the write mode W at a cycle half of the write mode W in response to the count-up signal CA2 provided from the gate circuit 28 and the address output thereof is supplied to the frame memory 4 through the selectors 19 and 18 once for the read mode R being selected twice.

Taking the first frame as an example, after "0000" is set in the first address counter 23 and "2000" is set in the second address counter 25, the read/write timing signal R/W is provided by the first data timing signal D1. Then, the read/write timing signal R/W attains the level "H" at the first timing t1 to designate the write mode W. Thus, the video signal is supplied from the latch circuit 3 to the frame memories 4 and 5. As the address of the frame memory 4 at this time, "0000" is designated by the address output of the first address counter 23. At the next timing t2, the read/write timing signal R/W falls to the level "L" in response to the clock signal CL so that the read mode R is designated. Then, the content of the address "0000" of the frame memory 4 is read out and latched in the latch circuit 6. Further, at the subsequent timing t3, the write mode W is applied again and since the first address counter 23 is made to advance counting by the count-up signal CA1, the video signal is stored in the address "0001" in the frame memories 4 and 5.

At the fourth timing t4, the read mode R is applied and the address output of the second address counter 25 is supplied to the frame memories 4 and 5 through the selectors 19 and 18 so that the address "2000" is designated. Although no video signal is stored in the address "2000" of the frame memories 4 and 5 after turning on of the power supply, adaptation is usually made so that a video signal coming one frame ahead is stored therein. The content of the address "2000" is supplied to the P/S converters 7 and 8 and since the gate circuit 27 start operation at this time by the second data timing signal D2 shown in FIG. 5(f), the P/S converters 7 and 8 convert the 8-bit parallel video signal to a serial signal. The P/S converters 7 an 8 are made to supply a transfer timing signal CT having a frequency twice the frequency of the read/write timing signal R/W because it is only needed to transfer the data to the driver 9 before the subsequent trigger signal is applied. In addition, if the signal latched in the latch circuit 6 is made to be provided simultaneously at this time, the content of the address "0000" and the content of the address "2000" are converted simultaneously to serial signals, which are transferred to the driver 9.

Subsequently, in the same manner, writing and reading of the frame memories 4 and 5 are performed alternately. Writing is made successively for one address starting from the address "0000", while in reading, the picture element data of the upper display area 11 of the liquid crystal display 10 and the picture element data of the lower display area 12 starting from the address "2000" are read out alternately and these picture element data of the upper and lower display areas is transferred simultaneously but independently when the picture element data of the lower display are 12 is read out.

Accordingly, the video signal of the upper display area 11 is read out at the timing immediately before the end of the writing of the first frame and the video signal of the lower display area 12 is read out at the timing immediately after the end thereof. In other words, the writing time and the reading time for one frame are equal and in the reading operation, the video signal of the frame being presently written is read out for the upper display area 11 and the video signal of one frame ahead is read out for the lower display area 12.

In consequence, the picture signal is applied to the driver 9 at a speed equal to ½ of the writing speed to the frame memories 4 and 5, that is, with a relation in which the serial clock frequency of the S/P converter 2 is equal to twice the serial clock frequency of the P/S converters 7 and 8. Thus, the continuity of the video signal is maintained in the upper and lower screen regions and if a moving picture is represented, the picture is stably displayed. Since the video signal is serial data, the latter half of the n−1th frame and the first half of the nth frame are continuous.

The display signal D serving as the display timing for indicating the effective display area of the picture element data may be formed based on the vertical blanking signal V after the horizontal blanking signal H to be made ineffective is counted. Display timing can be easily applied by using a blanking signal and since a display timing signal is also provided in an apparatus such as a personal computer in which digital picture element data is directly processed, such a display timing signal can be directly utilized. However, it sometimes happens that such a blanking signal or such a display timing signal causes a delay in timing, resulting in the center of the picture being located in the center of the screen of the liquid crystal display 10. This problem can be solved in the present invention by making a delay in the display signal D since the timing of transfer to the frame memories 4 and 5 is based on the display signal D. In the following, an embodiment adopting such method will be described.

Figure 6:
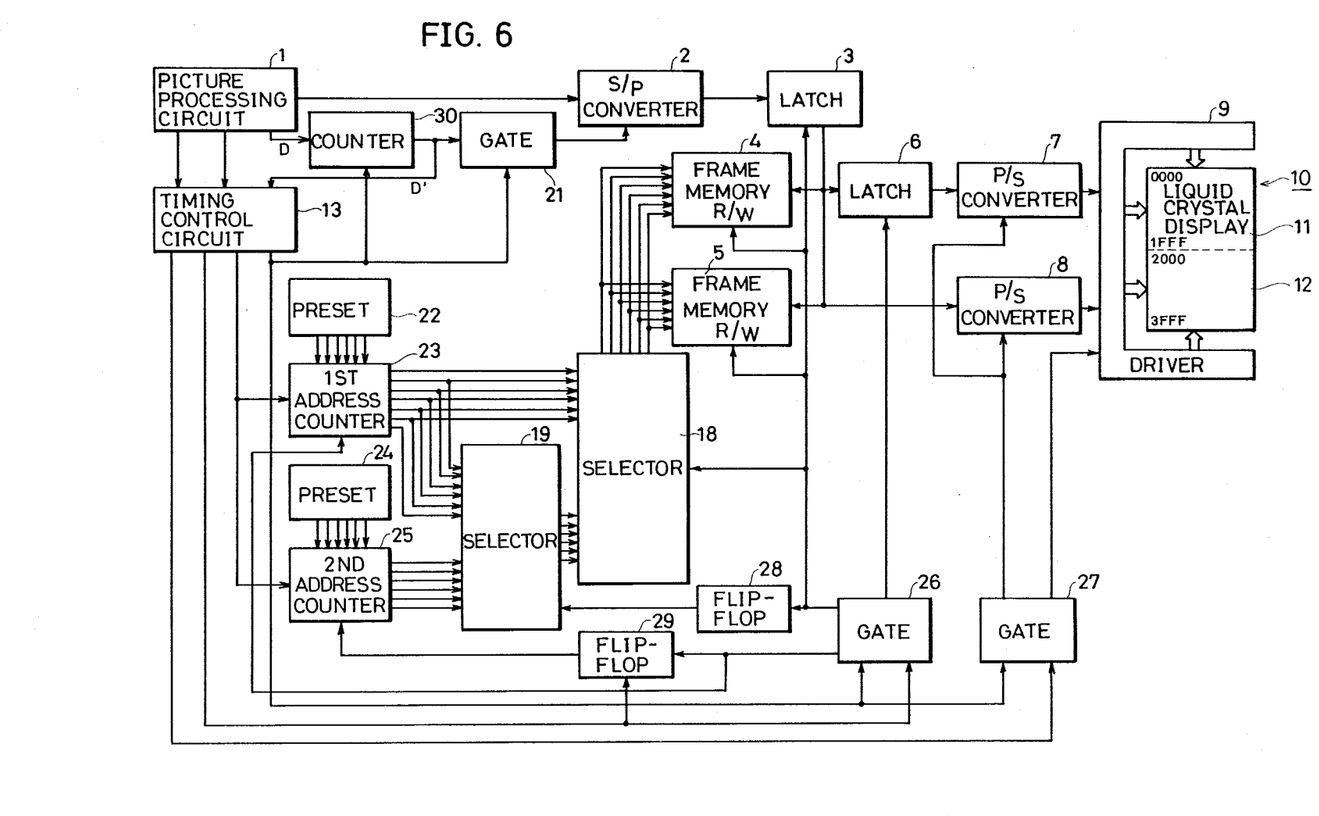
FIG. 6 is a specific block diagram of a further embodiment of the present invention.

FIG. 6 is a specific block diagram of a further embodiment of the present invention. In the embodiment shown in FIG. 6, a counter 30 is provided between the picture processing circuit 1 and the gate circuit 21 for the purpose of applying a delay to the display signal D to be supplied to the gate circuit 21 shown in FIG. 3. The counter 30 delays the display signal D and for this purpose, it generates a display signal D' based on an output delayed by several clocks from the vertical blanking signal V or the display timing signal. The delay of the display signal D' is effective in a range of 0 to 8 clocks.

In any of the above described embodiments, the case of displaying a monochromatic picture on the liquid crystal display 10 was taken as an example. In the following, a further embodiment for display of a color picture on the liquid crystal display 10 will be described.

Figure 7:
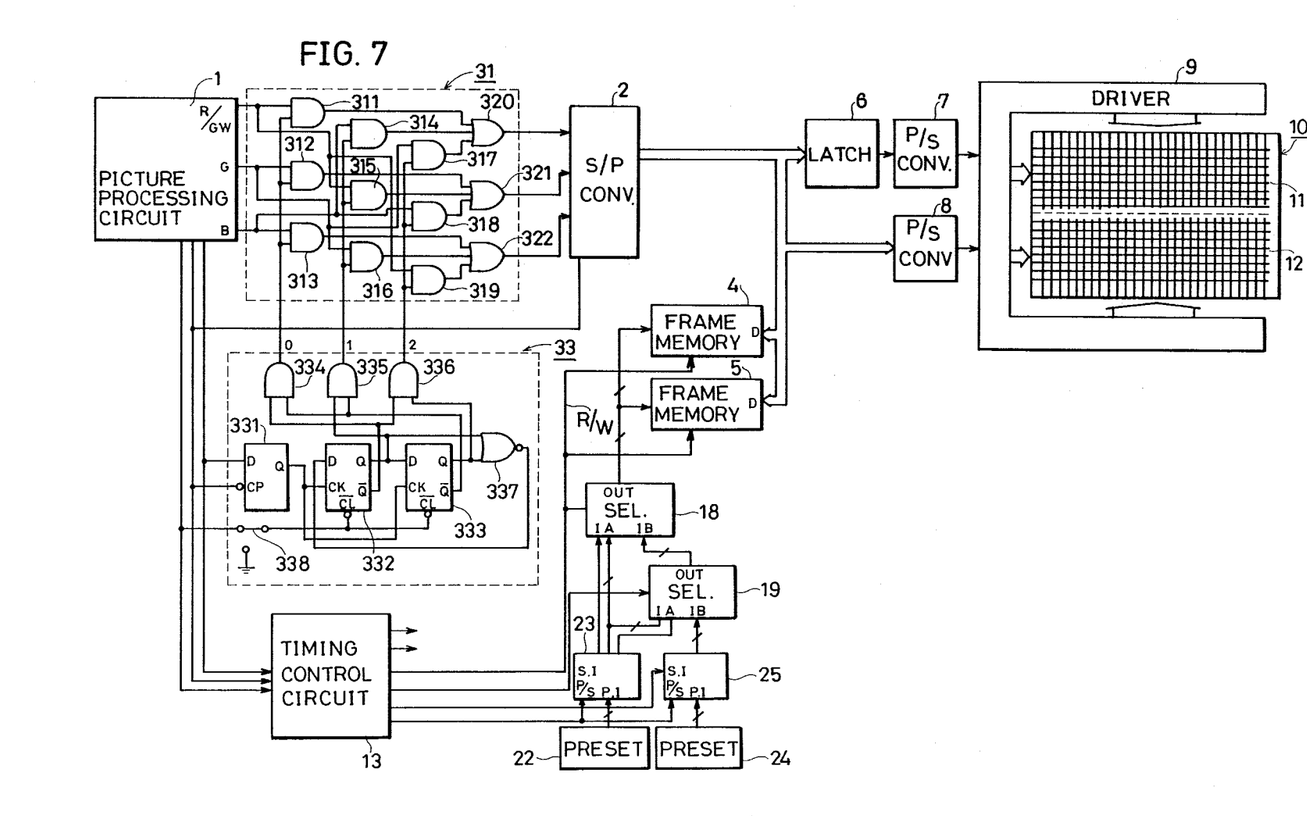
FIG. 7 is a specific block diagram of a still further embodiment of the present invention.

FIG. 7 is a specific block diagram of a further embodiment of the present invention. This embodiment shown in FIG. 7 has the same construction as in the above described embodiments, except that a signal gate circuit 31 and a gate selection circuit 33 are provided in the embodiment shown in FIG. 7 so as to provide R, G, B color signals from the picture processing circuit 1 and to select successively these color signals. The signal gate circuit 31 serves to select the order of supply of the R, G, B color signals from the picture processing circuit 1 to the S/P converter 2. The signal gate circuit 31 comprises AND gates 311 to 319 and OR gates 320 to 322.

Figure 9A:
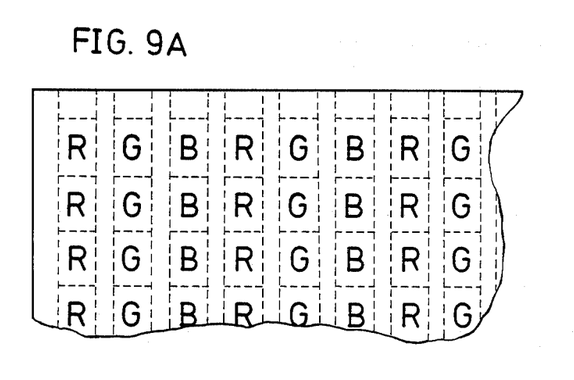
FIGS. 9A and 9B are illustrations showing color patterns displayed according to the embodiment shown in FIG. 7.

The gate selection circuit 33 serves to select R, G, B color signals by the signal gate circuit 31 so that the color arrangement is changed for one horizontal period (for each display signal D) or the color arrangement is fixed. For this purpose, the gate selection circuit 33 comprises a D-flip-flop 331 for applying timing based on the display signal D and the clock signal CL, D-flip-flops 332 and 333 forming a ternary ring counter, AND gates 334 to 336 and a NOR gate 337. When the ternary ring counter does not advance, the color signals provided from the signal gate circuit 31 are R, G, B signals which correspond to a color pattern in stripe as shown in FIG. 9A to be described later. When the ring counter advances counting, the order of color signals is changed for each horizontal period in such a manner as RGB, BRG, GBR, RGB . . .

Figure 8:
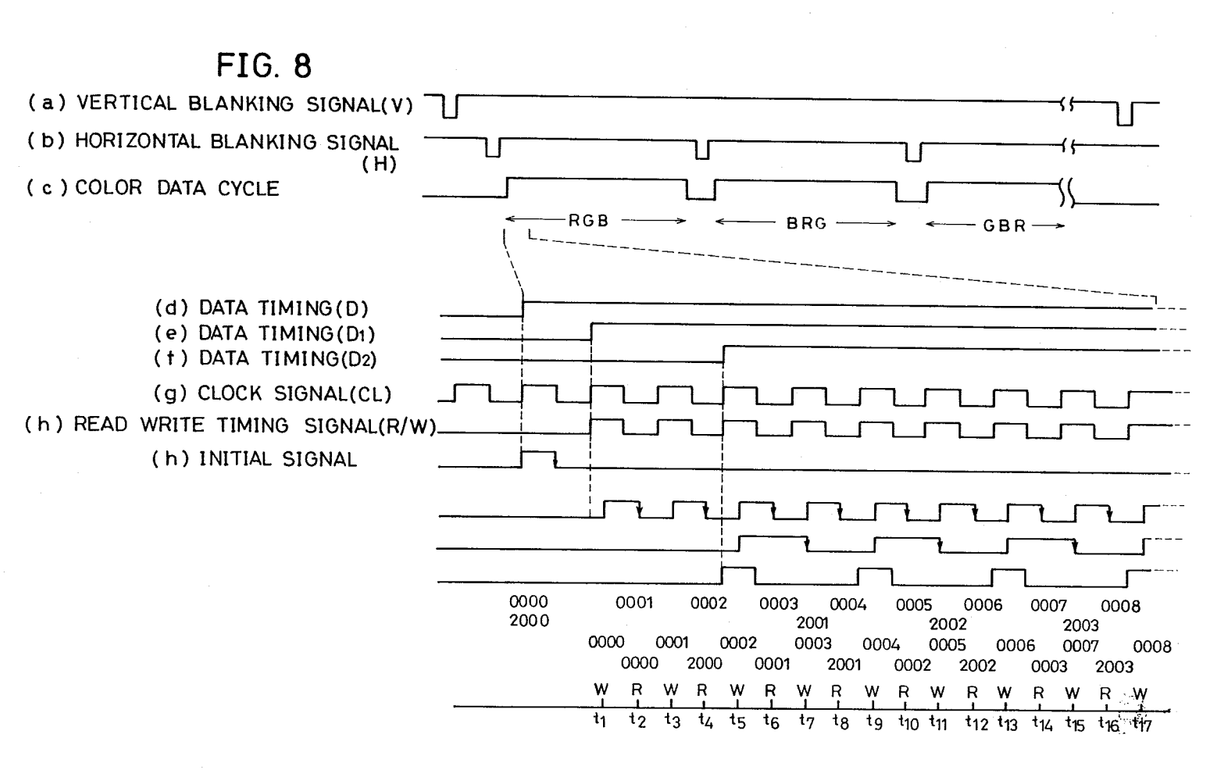
FIG. 8 is a waveform diagram of the respective portions shown in FIG. 7.
Figure 9B:
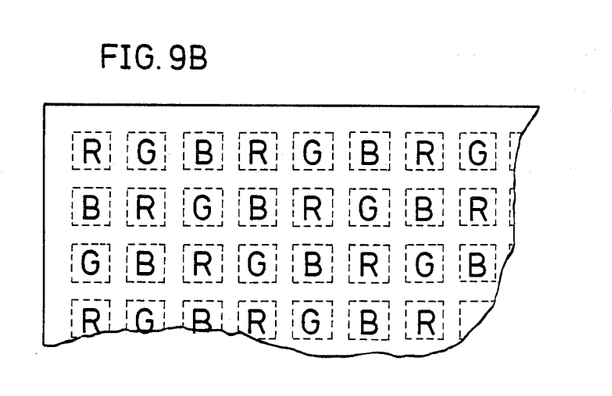

FIG. 8 is a waveform diagram of the respective portions in FIG. 7 and FIGS. 9A and 9B are illustrations showing color patterns represented by the embodiment shown in FIG. 7.

Now, referring to FIGS. 7 to 9B, an operation of the embodiment for displaying a color picture on the liquid crystal display 10 will be described in a specific manner. First, let us assume a case in which the color pattern on the liquid crystal display 10 is in a mozaic form as shown in FIG. 9B. The R, G, B color signals provided from the picture processing circuit 1 are supplied to the respective input terminals on one side of the AND gates 311, 312 and 313 included in the signal gate circuit 31.

At this time, the D-flip-flops 332 and 333 included in the gate selection circuit 33 are reset by the vertical blanking signal V and the respective Q outputs thereof are at the level "H". In consequence, only the AND gate 334 out of the gate selection circuit 33 provides a signal of the level "H" and this "H" level signal is supplied to the respective other input terminals of the AND gates 311, 312 and 312 of the signal gate circuit 31. As a result, the AND gates 311, 312 and 313 are opened and the R, G, B color signals are supplied from the AND gates 311, 312 and 313 to the S/P converter 2 through the OR gates 320, 321 and 322. The R, G, B color signals are converted to parallel signals by the S/P converter 2 and the parallel signals thus converted are written in the frame memories 4 and 5 in the same manner as described previously in connection with the embodiment in FIG. 3.

The ternary ring counter comprising the D-flip-flops 332 and 333 in the gate selection circuit 33 is made to advance counting each time the display signal D is provided, and when the D-flip-flop 332 is set, the AND gate 335 is opened this time and the AND gates 314, 315 and 316 of the signal gate circuit 31 are opened. Since the B signal is supplied to the AND gate 314, the R signal is supplied to the AND gate 315 and the G signal is supplied to the AND gate 316, the color signals are provided in the order of B, R and G. Further, when the D-flip-flop 333 is set, the AND gate 336 is opened and the AND gates 317, 318 and 319 of the signal gate circuit 31 are opened. Since the G signal is supplied to the AND gate 317, the B signal is supplied to the AND gate 318 and the R signal is supplied to the AND gate 319, the color signals are provided in the order of G, B and R. By repeating the above described operation, picture element data is represented as a color pattern shown in FIG. 9 on the liquid crystal display 10.

If a switch 338 for selection between the vertical blanking signal V and the grounding potential is connected to the D-flip-flop 333 and this switch is turned to the grounding side, the D-flip-flops 332 and 333 are kept reset. Then, only the AND gates 311, 312 and 313 out of the signal gate circuit 31 are opened continuously and color signals are provided in the order of R, G and B, whereby the picture element data can be represented as a color pattern as shown in FIG. 9A on the liquid crystal display 12.

Figure 10:
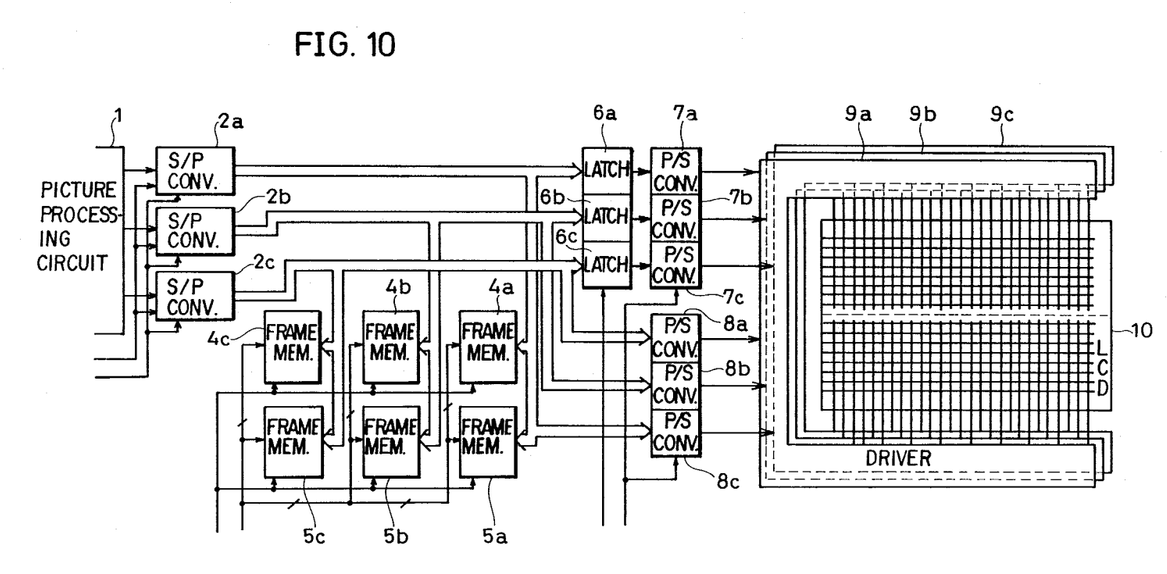
FIG. 10 is a block diagram showing another example of the peripheral circuit of the frame memories in the embodiment shown in FIG. 7.

FIG. 10 is a block diagram showing another example of the circuit around the frame memories in the embodiment shown in FIG. 7.

In the above described embodiment shown in FIG. 7, the picture element data provided from the picture processing circuit 1 is supplied from the S/P converter 2 to the frame memories 4 and 5 by means of a group of data bus, while in the example shown in FIG. 10, three groups of data bus are connected. More specifically, corresponding to the respective R, G, B color signals, S/P converters 2a to 2c, latch circuit 6a to 6c, P/S converters 7a to 7c and 8a to 8c, frame memories 4a to 4c and 5a to 5c and drivers 9a to 9c are provided. Thus, data can be made to flow as three groups and the data bus and the memory blocks can be used for each color signal as in a manner in which the frame memories 4a and 5a of the first block store only the R signal in the first horizontal period and store only the B signal in the second horizontal period. In addition, since the addresses of the frame memories 4a to 4c and 5a to 5c can be used commonly among the three blocks, timing can be easily controlled.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A picture display device comprising:
   a liquid crystal display for displaying images in dot matrix form, said display being divided into an upper display area and a lower display area,
   frame memories for storing picture element data for one frame corresponding to the dots of the divided two display areas of said liquid crystal display,
   writing means for storing in said frame memories, the picture element data in the order of picture elements based on video signals successively applied,
   reading means for reading said picture element data stored in said frame memories,
   timing control means for controlling said reading means and said writing means so that said reading means and said writing means are syncronized and operate alternately and for controlling said reading means so that the picture element data corresponding to the dot matrix of the upper display area of said liquid crystal display and the picture element data corresponding to the dot matrix of the lower display area thereof are read out alternately from said frame memories,
   said timing control means including:
   clock signal generating means for generating a clock signal,
   display timing signal generating means for generating a display timing signal indicating an effective display area for said picture element data successively applied, and
   delay timing signal generating means for generating a timing signal for delaying by several clocks the display timing signal generated from said display timing signal generating means, based on the clock signal generated from said clock signal generating means;
   said writing means comprises means for storing said picture element data in said frame memories in response to the generation of said delay timing signal from said delay timing signal generating means; and
   drive means for driving said liquid crystal means based on the picture element data read out by said reading means.

2. A picture display device in accordance with claim 1, wherein
   said writing means comprises means for writing said picture element data in the order of picture elements for every n bits, and
   said reading means comprises means for reading picture element data for every n bits from said frame memories.

3. A picture display device in accordance with claim 2, wherein
   said frame memories comprise m sets of memories, said writing means is provided corresponding to each of said m sets of memories and comprises means for writing said n-bit picture element data in the corresponding memory, and said reading means is provided corresponding to each of said m sets of memories and comprises means for reading successively the n-bit picture element data written in the corresponding memory.

4. A picture display device in accordance with claim 3, wherein
said m sets of memories are provided corresponding to at least R, G and B color signals.

5. A picture display device in accordance with claim 2, wherein
said n bits correspond to the color signals.

6. A picture display device in accordance with claim 2, wherein
said n bits correspond to gradation signals.

7. A picture display device in accordance with claim 1, wherein
said delay timing signal generating means comprises:
first delay timing signal generating means for generating a first delay timing signal delayed by one clock with respect to said display timing signal and
second delay timing signal generating means for generating a second delay timing signal further delayed by a predetermined number of clocks with respect to said first delay timing signal,
said writing means comprises means for storing said picture element data in said frame memories in response to the generation of said first delay timing signal from said first delay timing signal generating means, and
said drive means comprises means for driving said liquid crystal display based on the picture element data read out by said reading means in response to the generation of said second delay timing signal from said second delay timing signal generating means.

8. A picture display device in accordance with claim 7, wherein
said first delay timing signal generating means comprises means for further delaying said first delay timing signal by an arbitrary number of clocks for the purpose of adjusting the location of a picture to be displayed on said liquid crystal display.

9. A picture display device in accordance with claim 1, wherein
said successively applied video signals are R, G and B color signals and
said picture display device further comprises color signal selecting means for selecting said R, G and B color signals and supplying the selected color signals to said frame memories.

10. A picture display device in accordance with claim 9, wherein
said color signal selecting means comprises
gates to which said R, G and B color signals are respectively supplied individually and
gate designating means for selecting said gates successively so that each of color signals is provided from each corresponding gate.

11. A picture display device in accordance with claim 10, wherein
said gate designating means comprises means for changing for each horizontal period, the order of the R, G and B color signals to be provided.

12. A picture display device in accordance with claim 9, wherein
said frame memories are provided corresponding to said R, G and B color signals and each of said frame memories comprises a memory for storing the corresponding color signal selected by said color signal selecting means.

* * * * *